Feb. 9, 1926.

J. KELLER, SR 1,572,725

ROLLER BEARING

Filed Sept. 28, 1922

Inventor
Julius Keller, Sr.
By Wm. C. Bell
Atty.

Patented Feb. 9, 1926.

1,572,725

UNITED STATES PATENT OFFICE.

JULIUS KELLER, SR., OF CHICAGO, ILLINOIS.

ROLLER BEARING.

Application filed September 28, 1922. Serial No. 591,013.

*To all whom it may concern:*

Be it known that I, JULIUS KELLER, Sr., a citizen of the United States, residing at Chicago, in the county of Cook and State of Illinois, have invented certain new and useful Improvements in Roller Bearings, of which the following is a specification.

The primary object of this invention is to reduce the friction of roller bearings by providing a roller of novel form having its sides shaped for contact with other parts of the bearing with a minimum of friction.

A further object of the invention is to provide a roller especially adapted for conical bearings and having its sides shaped to engage the roller retainer without appreciable wear or friction. In the accompanying drawings I have illustrated the invention in a conical bearing embodying a plurality of series of rollers, each series being carried by a retainer, and the parts being assembled so that the rollers in one retainer will have one side arranged in engagement with the retainer and the other side in engagement with an adjacent retainer, and referring thereto—

Figure 1:
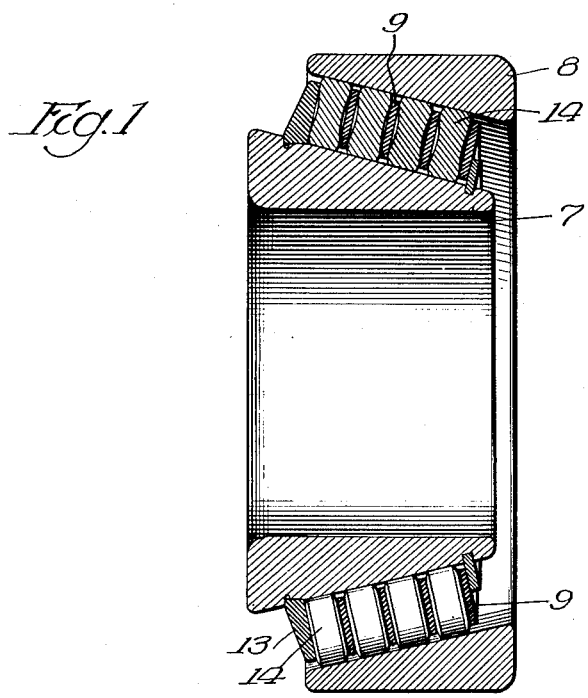
Fig. 1 is a sectional view of a bearing.
Figure 2:
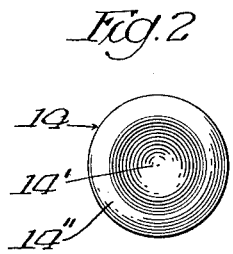
Fig. 2 is a plan view showing one side of a roller.
Figure 3:
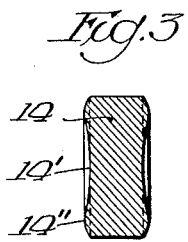
Fig. 3 is a central sectional view through a roller.
Figure 4:
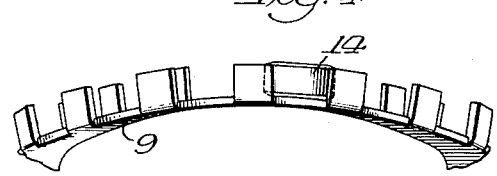
Fig. 4 is a perspective view of a portion of a coned or dished retainer for a conical bearing and showing one roller positioned therein.

In the drawings the conical bearing members 7 and 8 have parallel opposing faces and one or more series of cylindrical rollers are arranged to flatly engage and travel upon these surfaces. Each series of rollers is held in its own retainer 9 and for a conical bearing, in which my invention is especially advantageous, each retainer is coned or dished so that the rollers will be supported and held in a position normal to the bearing surfaces, as shown in Fig. 1. My invention will be better understood if I first explain the disadvantages of the plain or flat-side cylindrical roller which has been used heretofore; and referring to Fig. 6 I have shown the old type of roller 10 in its own retainer 11 with its outer side engaged with an adjacent retainer 12. It will be noted that the old flat-side roller makes a one point contact at 10' with its own retainer 11 and makes a two point contact at 10'' with the adjacent retainer. In this connection it may be noted that the adjacent retainer 12 represents also the washer 13 which is engaged with the member 7 for holding the bearing in place thereon, in the case of that series of rollers which lies adjacent said washer. It will be understood that the primary reason for this one point contact on one side and a two point contact on the other side of the flat-side roller 10 is due to the fact that the retainers are coned or dished for the conical bearing in which they are used. The result of this construction is that much wear is produced by the engagement of the roller with the retainer and particularly with the adjacent retainer where it makes two point contact; and not only is this construction objectionable because of this wear but it produces considerable friction and causes the rollers to drag and generally lessens the efficiency of the bearing.

Figure 5:
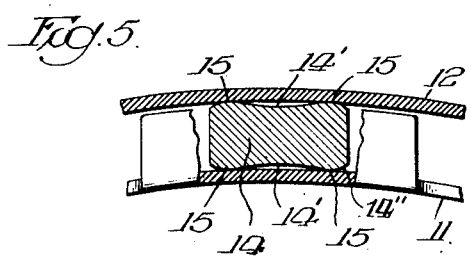
Fig. 5 is a detail enlarged sectional view to show how the roller engages parts adjacent its sides.
Figure 6:
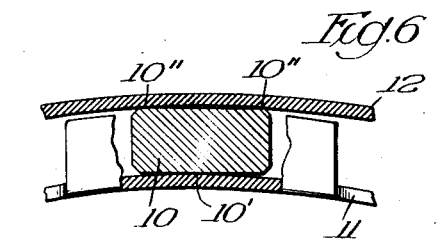
Fig. 6 is a similar view showing the old type of cylindrical roller.

My invention entirely overcomes these difficulties, and my improved roller and the manner in which it works in the bearing is illustrated in Fig. 5 for comparison with the flat-side roller illustrated in Fig. 6. My roller 14 has both sides dished or recessed at 14' centrally and it is provided with a curved peripheral contact ring surface 14'' between the central recess and the face of the roller whereby the roller makes two point contact at 15 on both sides thereof. The contact ring surface is curved radially of the roller and has the form of a corrugation concentric with the roller and terminating at its outer edge substantially at the edge of the face of the roller.

I have found in practice that my improved roller 14 produces no appreciable wear whatever, whereas the flat-side roller 10 produced a material cutting wear which, as before stated, lessens the efficiency and the life of the bearing. After a prolonged test of a bearing equipped with my improved rollers 14 it was impossible to discover any appreciable wear on any part of the bearing structure and this and other tests have demonstrated the superior efficiency of the new rollers over flat-side rollers. I have found that my improved roller operates with a minimum of friction, it rolls freely between the bearing surfaces and provides a free and smooth running bearing with negligible friction. I have also found that my new roller is held in better alinement and position in a bearing than has been possible heretofore with flat-side rollers, and consequently the operation of a bearing with my improved rollers is very much more efficient than a bearing with a flat-side roller and it will last much longer.

In the drawings I have shown my improved roller with its sides recessed or dished as nearly like the rollers which I have actually used as it is possible to represent them in an illustrative drawing of this kind and while I have found this shape highly efficient and satisfactory I appreciate that for other retainers and for bearings of different kinds it may be desirable to vary the shape of same, and therefore I reserve the right to make all such changes in the form, proportion and construction of the roller as fairly fall within the scope of the following claims.

I claim:

1. A roller bearing roller having a cylindrical bearing engaging surface, and a circular concentric bead on each of the lateral faces of said roller adjacent to the circumference thereof for contacting with the adjacent retainers.

2. A roller bearing roller having a cylindrical bearing engaging surface, said roller being chamfered at the edge, each of the lateral sides of said roller being centrally concave.

3. The combination with a conical roller bearing comprising retaining means, of a plurality of rollers assembled in said means, each of said rollers having a cylindrical bearing engaging surface, and a circular concentric bead on each of the lateral faces of said roller adjacent to the circumference thereof.

4. In a roller bearing, the combination of an inner conical bearing race, an outer conical bearing race, a plurality of series of roller bearings between said conical races, each of said roller bearings being chamfered off at the edge on one side and being centrally concave on the other side, and conical spacers between the series of bearings.

JULIUS KELLER, Sr.